(12) United States Patent
Feil et al.

(10) Patent No.: US 10,322,665 B2
(45) Date of Patent: Jun. 18, 2019

(54) HOLDING DEVICE FOR LAMPS IN VEHICLE LIGHTS HAVING A PLATE-LIKE SECTION WITH RECEPTACLE PROVIDING SPACE FOR DIFFERENT TYPES OF LAMPS AND VEHICLE LIGHT

(71) Applicant: OSRAM GmbH, Munich (DE)

(72) Inventors: Thomas Feil, Iggingen (DE); Christoph Henle, Langenau (DE); Martin Petzold, Ellwangen (DE); Peter Helbig, Sontheim an der Brenz (DE)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 15/622,167

(22) Filed: Jun. 14, 2017

(65) Prior Publication Data

US 2017/0361758 A1    Dec. 21, 2017

(30) Foreign Application Priority Data

Jun. 15, 2016  (DE) ........................ 10 2016 210 673

(51) Int. Cl.
*B60Q 1/04*  (2006.01)
*F21K 9/23*  (2016.01)
*B60Q 1/26*  (2006.01)
*F21S 41/19*  (2018.01)
*F21Y 115/10* (2016.01)
(Continued)

(52) U.S. Cl.
CPC ......... *B60Q 1/0433* (2013.01); *B60Q 1/0483* (2013.01); *B60Q 1/2623* (2013.01); *B60Q 1/2696* (2013.01); *F21K 9/23* (2016.08); *F21S 41/192* (2018.01); *B60Q 2900/10* (2013.01); *F21S 41/141* (2018.01); *F21S 41/162* (2018.01);
(Continued)

(58) Field of Classification Search
CPC .......... F21S 41/192; F21K 9/23; F21K 9/232; F21K 9/233; F21K 9/235; F21K 9/237; F21K 9/238; F21Y 2115/10; B60Q 1/2696; B60Q 1/0433
See application file for complete search history.

(56) References Cited

U.S. PATENT DOCUMENTS 4,733,335 A * 3/1988 Serizawa ............... B60Q 1/302
                                                            362/503
6,184,628 B1 * 2/2001 Ruthenberg ....... H05B 33/0827
                                                            315/185 R
(Continued)

FOREIGN PATENT DOCUMENTS

DE            69608687 T2    2/2001
DE       202007008956 U1    9/2007
(Continued)

OTHER PUBLICATIONS

German Office Action based on application No. 10 2016 210 673.2 (9 pages) dated Feb. 3, 2017 (for reference purpose only).

*Primary Examiner* — Robert J May
(74) *Attorney, Agent, or Firm* — Viering, Jentschura & Partner MBB

(57) ABSTRACT

In various embodiments, a holding device for lamps in vehicle lights is provided. The holding device may include a plate-like section that is provided with at least one receptacle for a lamp, and socket contacts for the energy supply of the lamp arranged in the receptacle. The at least one receptacle is realized in such a way that it provides space for different types of lamps.

12 Claims, 12 Drawing Sheets

(51) Int. Cl.
    *F21S 41/141*   (2018.01)
    *F21S 41/162*   (2018.01)
    *F21S 45/47*    (2018.01)

(52) U.S. Cl.
    CPC ............... *F21S 41/19* (2018.01); *F21S 45/47* (2018.01); *F21Y 2115/10* (2016.08)

(56) References Cited

U.S. PATENT DOCUMENTS

| | | | | |
|---|---|---|---|---|
| 7,153,008 | B2 * | 12/2006 | Grote, III | B60Q 1/2696 |
| | | | | 362/487 |
| 7,748,886 | B2 * | 7/2010 | Pazula | H01R 33/94 |
| | | | | 362/353 |
| 2004/0042208 | A1 * | 3/2004 | Wu | F21V 5/045 |
| | | | | 362/245 |
| 2010/0103692 | A1 | 4/2010 | Helbig | |
| 2017/0373412 | A1 * | 12/2017 | Chen | F21V 23/004 |

FOREIGN PATENT DOCUMENTS

| | | | | |
|---|---|---|---|---|
| DE | 102007015923 A1 | 10/2008 | | |
| EP | 2363634 A2 * | 9/2011 | | F21S 8/02 |

\* cited by examiner

HOLDING DEVICE FOR LAMPS IN VEHICLE LIGHTS HAVING A PLATE-LIKE SECTION WITH RECEPTACLE PROVIDING SPACE FOR DIFFERENT TYPES OF LAMPS AND VEHICLE LIGHT

CROSS-REFERENCE TO RELATED APPLICATION

This application claims priority to German Patent Application Serial No. 10 2016 210 673.2, which was filed Jun. 15, 2016, and is incorporated herein by reference in its entirety.

TECHNICAL FIELD

Various embodiments relate generally to a holding device for lamps in vehicle lights and to a vehicle light with such a holding device.

SUMMARY

In various embodiments, a holding device for lamps in vehicle lights is provided. The holding device may include a plate-like section that is provided with at least one receptacle for a lamp, and socket contacts for the energy supply of the lamp arranged in the receptacle. The at least one receptacle is realized in such a way that it provides space for different types of lamps.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
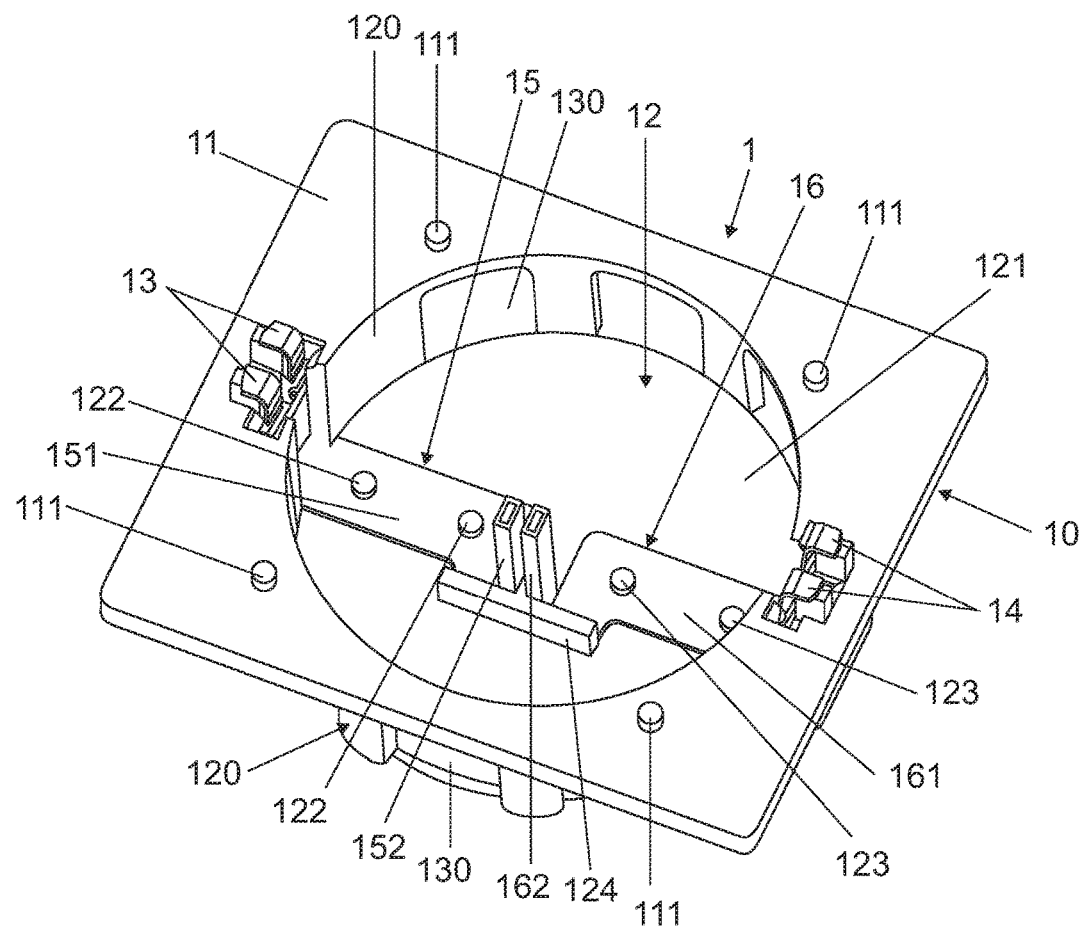
FIG. 1 shows a holding device according to a first embodiment in the form of an isometric representation.
Figure 2:
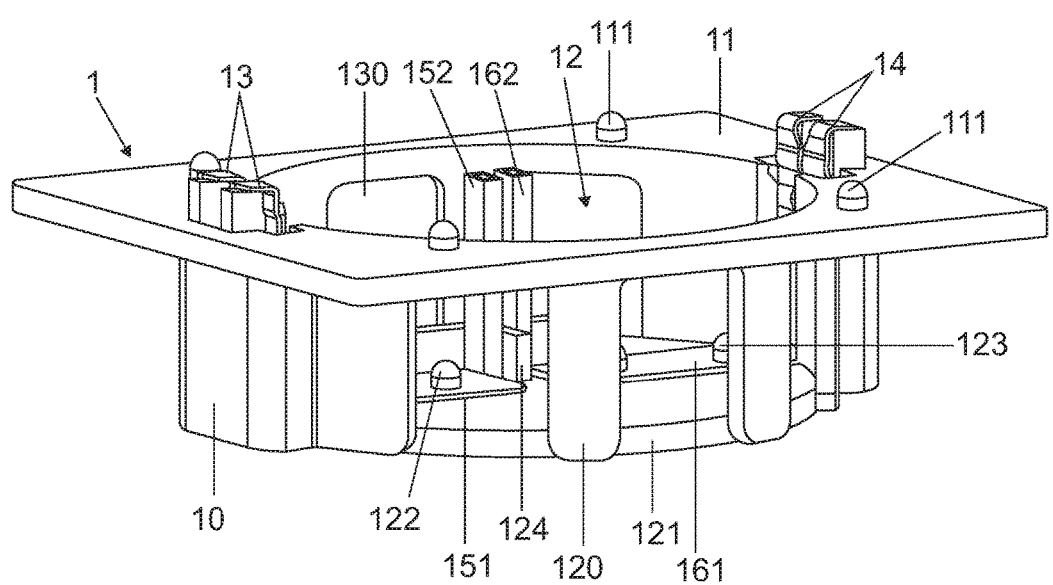
FIG. 2 shows another isometric representation of the holding device illustrated in FIG. 1 according to the first embodiment.
Figure 3:
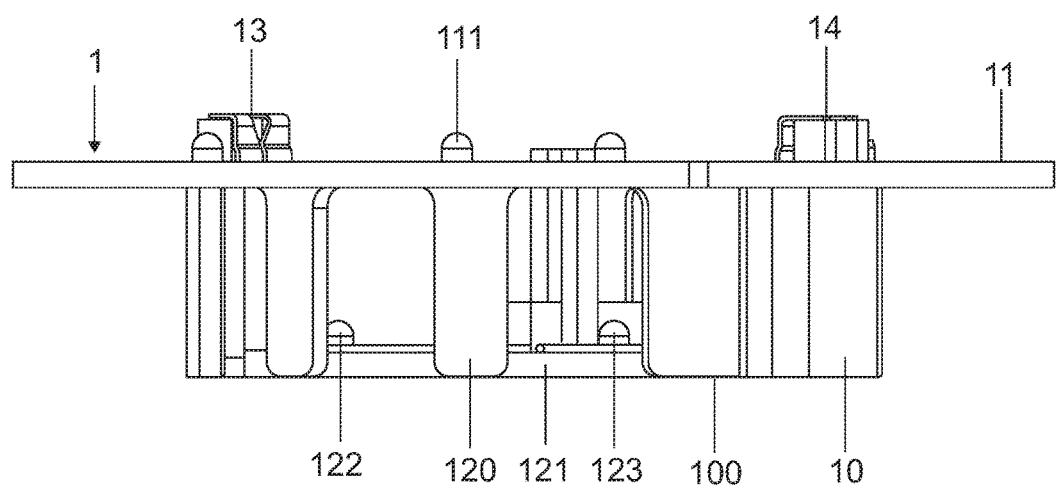
FIG. 3 shows a side view of the holding device according to the first embodiment.
Figure 4:
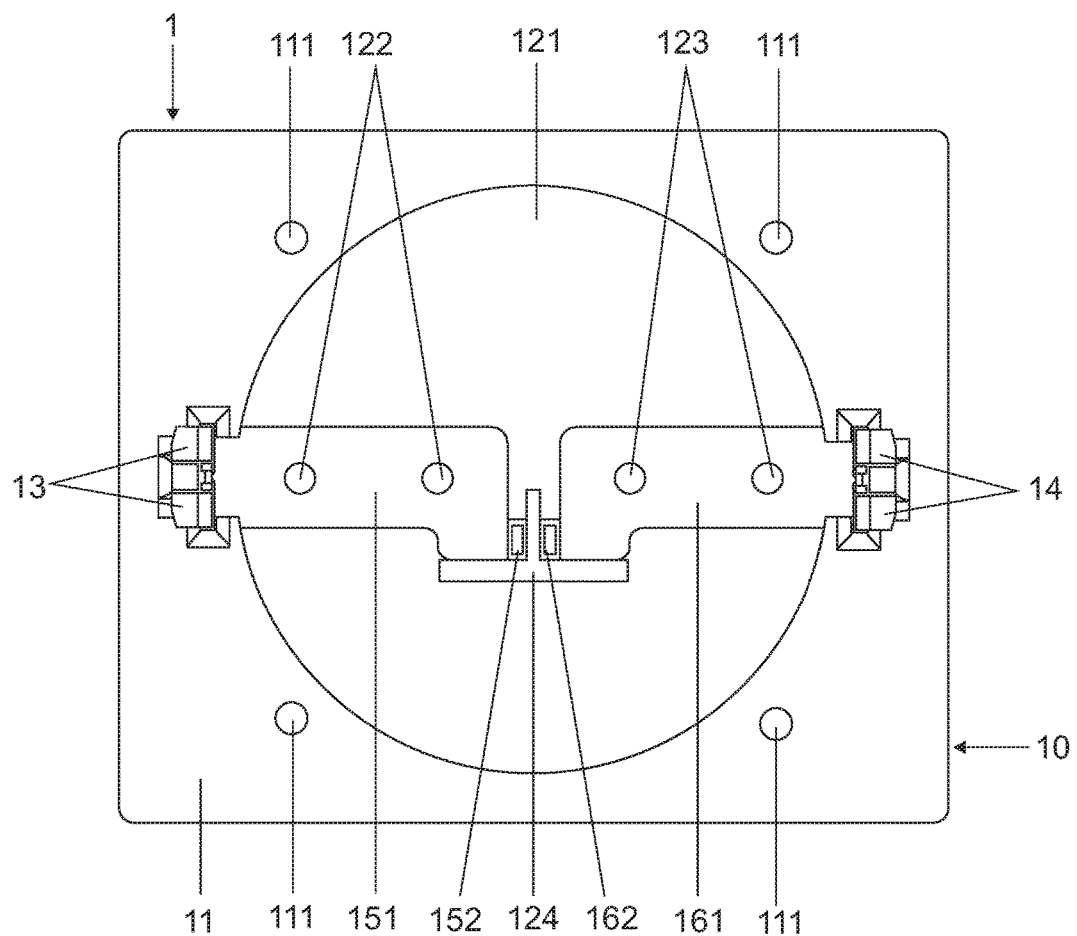
FIG. 4 shows a top view of the holding device according to the first embodiment.
Figure 5:
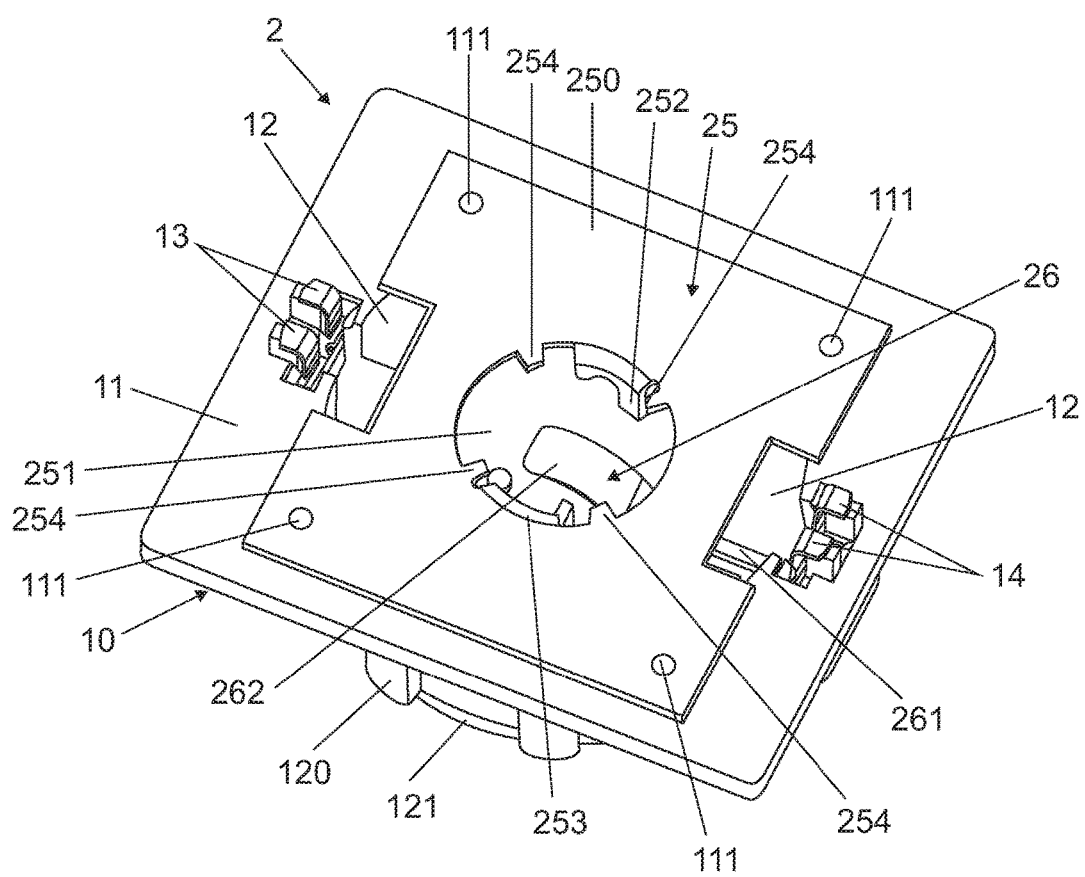
FIG. 5 shows a holding device according to a second embodiment in the form of an isometric representation.
Figure 6:
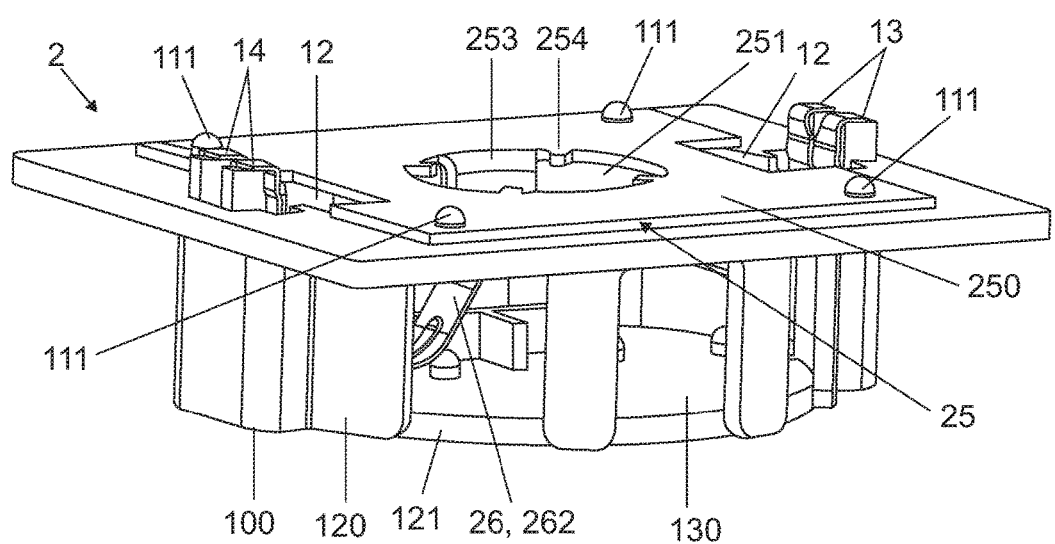
FIG. 6 shows another isometric representation of the holding device illustrated in FIG. 5 according to the second embodiment.
Figure 7:
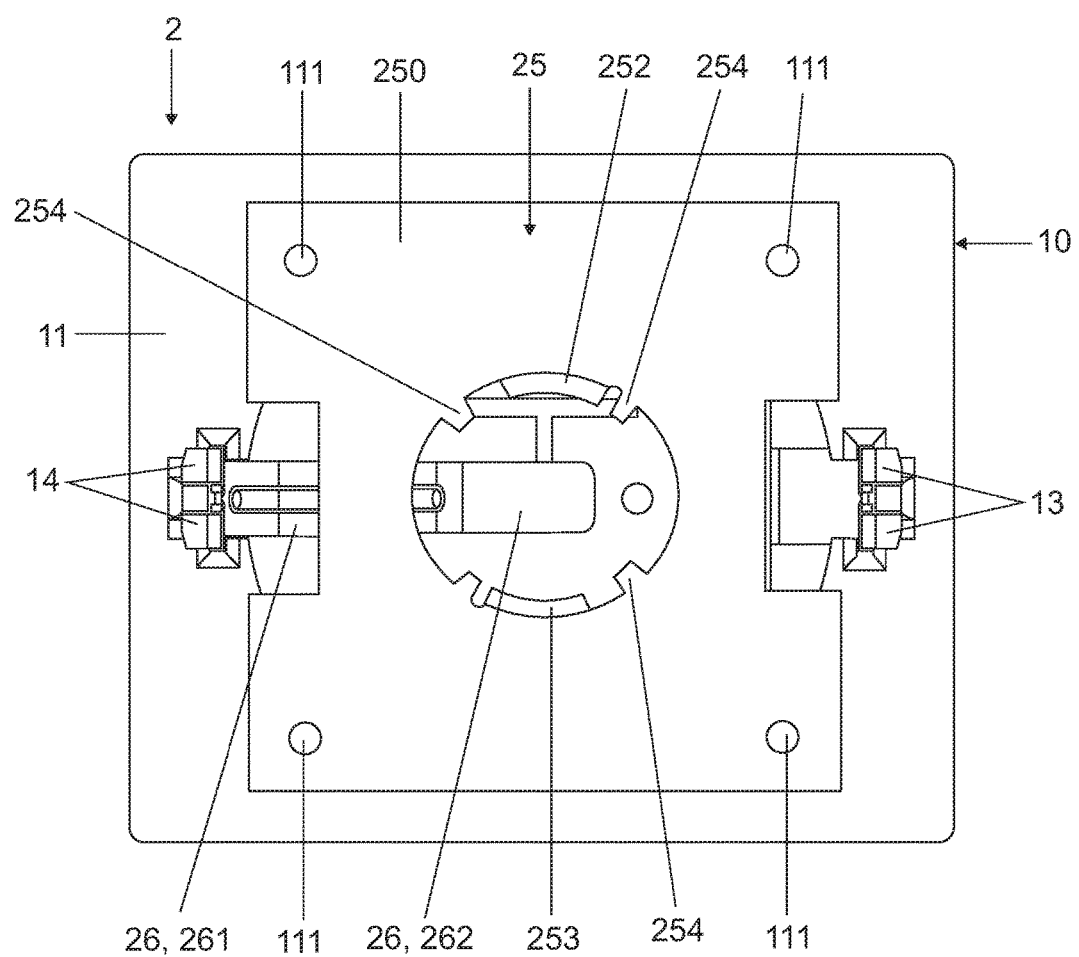
FIG. 7 shows a top view of the holding device according to the second embodiment.
Figure 8:
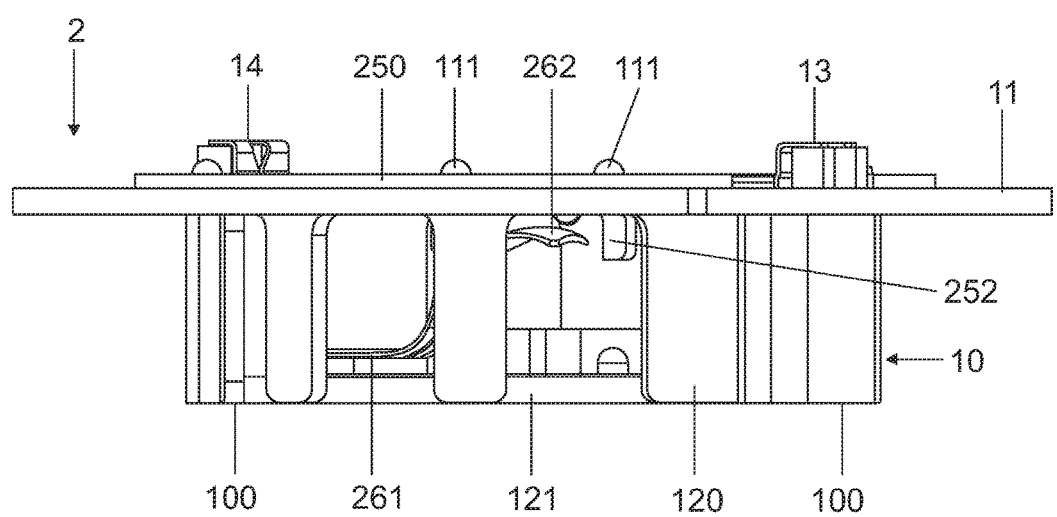
FIG. 8 shows a side view of the holding device according to the second embodiment.

The following detailed description refers to the accompanying drawings that show, by way of illustration, specific details and embodiments in which the invention may be practiced.

Various embodiments make available a holding device for lamps in vehicle lights, which allows a simplified lamp conversion of vehicle lights such as, for example, a conversion from incandescent lamps to LED lamps. In this context, the term "LED lamp" refers to a lamp that comprises at least one semiconductor light source.

Various embodiments hold device serves for holding lamps in vehicle lights and features a plate-like section that is provided with at least one receptacle for a lamp, wherein socket contacts for the energy supply of the lamp are arranged in the receptacle, and wherein the at least one receptacle is realized in such a way that it provides space for different types of lamps.

Due to the aforementioned characteristics of the inventive holding device, a less elaborate lamp conversion of vehicle lights can be realized. The plate-like section of the inventive holding device allows a simple installation of the holding device on the housing of a vehicle light. For example, it may be fixed in a groove of the housing or screwed on the housing and realized in the form of a cover for an opening on one side of the housing. The special design of the at least one receptacle for a lamp on the plate-like section of the inventive holding device allows the installation of different types of lamps in the holding device. In this way, a vehicle light can be converted to a different type of lamp with little effort by exchanging the holding device and, if applicable, a lens assigned to the lamp.

For example, a vehicle light can be converted to LED lamps by replacing an inventive holding device for incandescent lamps with an inventive holding device for LED lamps and, if applicable, replacing a reflector for incandescent lamps with a reflector for LED lamps.

For reasons of manufacturing technology, at least the plate-like section of the inventive holding device may be realized in the form of an injection-molded plastic part.

For reasons of manufacturing technology, the socket contacts in the at least one receptacle of the inventive holding device may be realized in the form of punched-and-bent parts.

The holding device may feature electrical connections that are connected to the socket contacts arranged in the at least one receptacle in an electrically conductive fashion in order to ensure the supply of the lamp with electrical energy via the electrical connections and the socket contacts, as well as via the electrical contacts of the lamp. It may be provided that the electrical connections are respectively realized integrally with a socket contact and in the form of a punched-and-bent part.

According to various embodiments, the socket contacts are adapted to base contacts of an incandescent lamp base or electrical contacts of an LED lamp in order to convert a vehicle light to incandescent lamps or LED lamps as easily as possible.

The holding device may be equipped with means for adapting the at least one receptacle to the outside dimensions of a lamp in order to ensure an additional support of the lamp in the receptacle.

The aforementioned means may include a cover for the at least one receptacle, which is provided with an opening. The cover provided with an opening makes it possible to easily adapt the dimensions of the at least one receptacle of the inventive holding device to the outside dimensions of a lamp.

FIGS. 1 to 4 show different views of a holding device 1 according to the first embodiment.

The holding device 1 according to the first embodiment includes an injection-molded plastic part 10, which forms a plate-like section 11 and a circular-cylindrical receptacle 12 for a lamp arranged thereon, two electrical connections 13, 14 that are embedded in the injection-molded plastic part 10, as well as two socket contacts 15, 16 and (not-shown) fastening means that are arranged on the plate-like section 11 and serve for fixing the holding device on a vehicle light.

The receptacle 12 is formed by a recess in the plate-like section 11 and has a circular-cylindrical sidewall 120 that is connected to the plate-like section 11, as well as a bottom 121 that extends parallel to the plate-like section 11. The circular-cylindrical sidewall 120 of the receptacle 12 is arranged perpendicular to the plate-like section 11, i.e. the cylinder axis of the circular-cylindrical receptacle 12 extends perpendicular to the plate-like section 11. The circular-cylindrical sidewall 120 of the receptacle 12 is provided with ventilation holes 130.

The electrical connections 13, 14 are realized in the form of metallic punched-and-bent parts and consist, for example, of special steel or brass or another metal with high electrical conductivity. The two electrical connections 13, 14 are arranged on the edge of the circular-cylindrical receptacle 12 diametrically opposite of one another. They serve for electrically contacting a lamp arranged in the receptacle 12 and are contacted with elements, which make available the supply voltage, during the installation of the holding device into the housing of a vehicle light. These elements may consist, for example, of a leadframe or connecting cable that is attached separately after the installation of the holding device.

The two socket contacts 15, 16 of the holding device 1 are arranged internally on the bottom 121 of the receptacle 12. They are respectively formed by a metallic punched-and-bent part that is fixed on the bottom 121. The socket contacts 15, 16 respectively feature a flat socket contact section 151, 161, which extends parallel to the bottom 121 and is respectively provided with two openings, and a hollow, web-like socket contact section 152, 162, which is angled relative to the flat socket contact section. The hollow, web-like socket contact section 152, 162 respectively extends perpendicular to the bottom 121 of the receptacle 12. It respectively serves for receiving a pin-like base contact of an LED lamp. The flat socket contact section 151 of the first socket contact 15 is electrically contacted with the first electrical connection 13 of the holding device 1. The first electrical connection 13 is particularly realized integrally with the first socket contact 15 in the form of a punched-and-bent part. However, the first electrical connection 13 and the first socket contact 15 may alternatively also be screwed, welded or soldered to one another. Projections 122 protruding from the bottom 121 extend through the openings of the flat socket contact section 151. The first socket contact 15 is fixed on the bottom 121 of the receptacle 12 in a clamping fashion with the aid of these projections 122. The flat socket contact section 161 of the second socket contact 16 is electrically contacted with the second electrical connection 14 of the holding device 1. The second electrical connection 14 is particularly realized integrally with the second socket contact 16 and in the form of a punched-and-bent part. However, the second electrical connection 14 and the second socket contact 16 may alternatively also be screwed, welded or soldered to one another. Projections 123 protruding from the bottom 121 extend through the openings of the flat socket contact section 161. The second socket contact 16 is fixed on the bottom 121 of the receptacle 12 in a clamping fashion with the aid of these projections 123. The two socket contacts 15, 16 are arranged such that they are electrically insulated from one another. Internally, the bottom 121 features a T-shaped web 124 consisting of electrically insulating material, the base section of which extends between the two web-like socket contact sections 152, 162 of the two socket contacts 15, 16 and serves as a stop for the exact positioning of the two socket contact sections 152, 162.

FIG. 5 to FIG. 8 show different views of a holding device 2 according to the second embodiment. The holding device 2 according to the second embodiment can only be distinguished from the above-described holding device 1 according to the first embodiment in that its socket contacts 25, 26 are designed differently. With respect to all other details, the holding device 2 according to the second embodiment corresponds to the holding device 1 according to the first embodiment. Consequently, identical components of the holding devices 1, 2 according to the two embodiments are identified by the same reference symbols in the figures and reference is made to the description of the holding device 1 according to the first embodiment with respect to the description of these components.

The holding device 2 according to the second embodiment includes an injection-molded plastic part 10, which forms a plate-like section 11 and a circular-cylindrical receptacle 12 for a lamp base arranged thereon, two electrical connections 13, 14 that are embedded in the injection-molded plastic part 10, as well as two socket contacts 25, 26 and (not-shown) fastening means that are arranged on the plate-like section 11 and serve for fixing the holding device on a vehicle light.

The injection-molded plastic part 10 and the receptacle 12, as well as the electrical connections 13, 14, are realized identical to the above-described holding device 1 according to the first embodiment.

The two socket contacts 25, 26 of the holding device 2 are arranged in the region of the receptacle 12 and adapted to the base contacts of an incandescent lamp base.

The first socket contact 25 comprises a metallic cover plate 250 for the receptacle 12 with a central opening 251 and two tabs 252, 253, which are diametrically arranged on the edge of the opening 251 and angled from the cover plate 250 into the interior of the receptacle 12. The first socket contact 25 is connected to the first electrical connection 13 of the holding device 2, to which the reference ground potential may be applied, in an electrically conductive fashion. The first electrical connection 13 is particularly realized integrally with the first socket contact 25 in the form of a punched-and-bent part. However, the first electrical connection 13 and the first socket contact 25 may alternatively also be screwed, welded or soldered to one another. The edge of the opening 251 is circular and the diameter of the opening 251 is smaller than the diameter of the circular-cylindrical receptacle 12 of the injection-molded plastic part 10. The diameter of the opening 251 is adapted to the diameter of the base sleeve of an incandescent lamp base. Four support tabs 254 are furthermore arranged on the edge of the opening 251 and serve for supporting an incandescent lamp base arranged in the opening 251. The first socket contact 25 is fixed on the plate-like section 11 of the injection-molded plastic part 10 in that an interference fit is produced with the aid of four openings, which are adapted to the projections 111 of the plate-like section 11, by means of a heat-staking.

The second socket contact 26 is formed by a metallic tab 26 that features a first section 261, which is fixed on the bottom 121 of the receptacle 12, and a second, angled section 262. The first section 261 of the tab 26 is connected to the second electrical connection 14 of the holding device 2 in an electrically conductive fashion. The second electrical connection 14 may be realized integrally with the second socket contact 26 in the form of a punched-and-bent part. However, the second electrical connection 14 and the second socket contact 26 may alternatively also be screwed, welded or soldered to one another. The second section 262 of the tab 26 is arranged between the bottom 121 of the receptacle 12 and the cover plate 250 and extends as far as into the region of the opening 251 of the cover plate 250. The second socket contact 26 in the form of a tab is adapted to the center contact of an incandescent lamp base.

Figure 9:
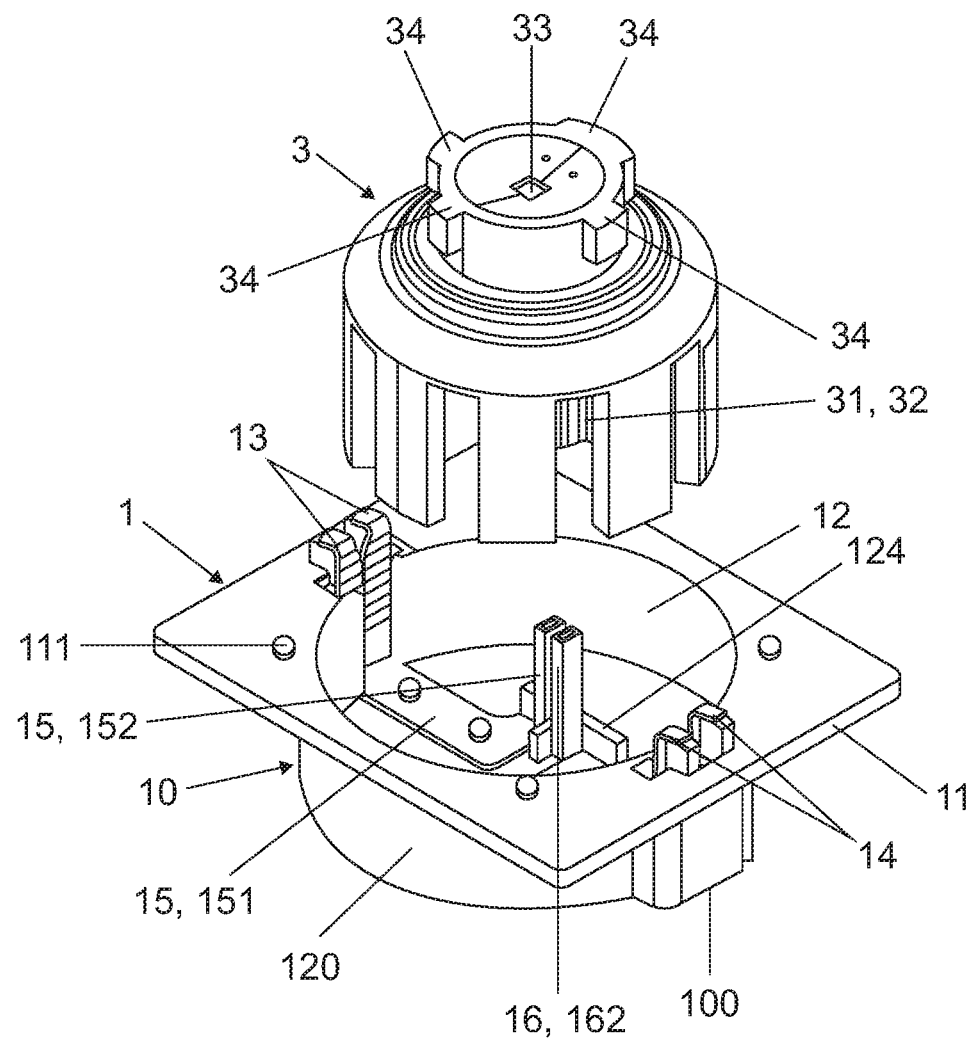
FIG. 9 shows an isometric representation of the holding device according to the first embodiment together with an LED lamp.

FIG. 9 schematically shows the interaction between a holding device 1 according to the first embodiment and an LED lamp 3. For example, the LED lamp consists of an exchangeable LED lamp of the ECE categories LR3, LR4, LR5, LW3, LW5, LY3 or LY5, which are used in a vehicle light, for example in the form of a brake light, a tail light, a backup light, a turn signal light, a daytime running light or a fog light. The LED lamp 3 features a heat sink 30, two electrical contacts 31, 32 in the form of contact pins and a semiconductor light source arrangement 33, for example in the form of one or more light-emitting diode chips, as well as four locking tabs 34 that are arranged in a common plane and serve for producing a bayonet coupling with a reflector of a vehicle light. The outside dimensions of the heat sink 30 of the LED lamp 3 are adapted to the diameter of the circular-cylindrical receptacle 12 in the injection-molded plastic part 10 in a precisely fitted fashion. After the insertion of the LED lamp 3 into the holding device 1, the two contact pins 31, 32 of the LED lamp 3 respectively form a plug-type connection with one of the hollow, web-like socket contact sections 152 and 162 of the socket contacts 15 and 16. In this way, the supply of the LED lamp 3 with electrical energy is ensured via the socket contacts 15, 16 and the electrical connections 13, 14 of the holding device 1.

Figure 10:
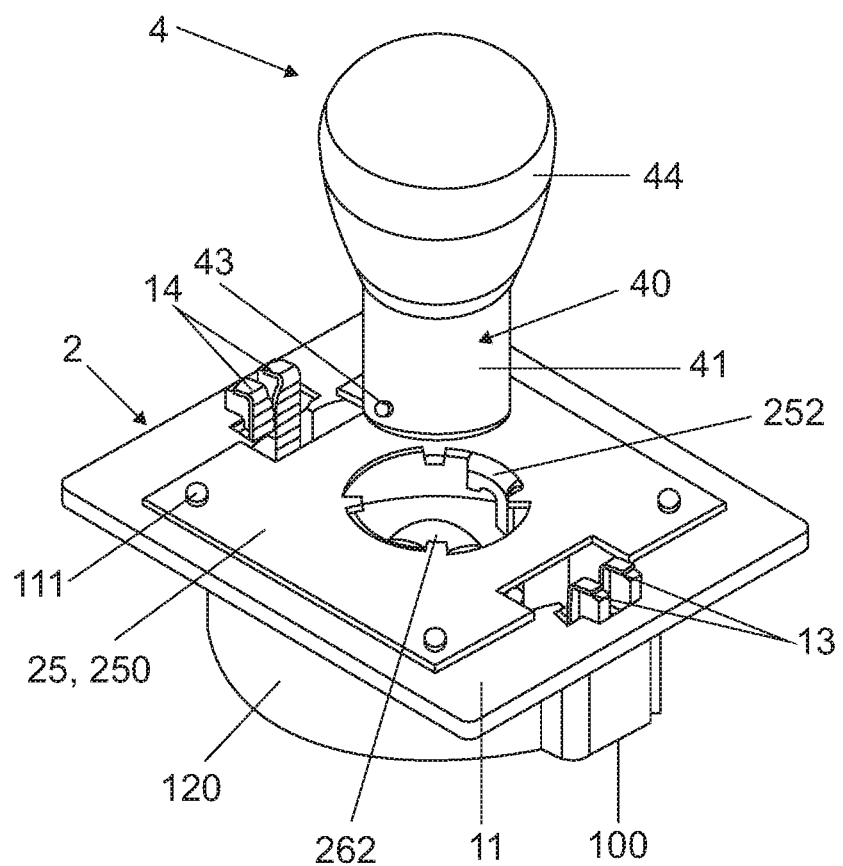
FIG. 10 shows an isometric representation of the holding device according to the second embodiment together with an incandescent lamp.

FIG. 10 schematically shows the interaction between a holding device 2 according to the second embodiment and an incandescent lamp 4. For example, the incandescent lamp consists of an incandescent lamp of the ECE categories P21W, PY21W, P21/4W, P21/5W, R5W, R10W or RY10W, which are used in a vehicle light, for example in the form of a brake light, a tail light, a backup light, a turn signal light, a fog light or a daytime running light. The incandescent lamp 4 features a lamp base 40 with a cylindrical, metallic base sleeve 41 and a center contact 42 (FIG. 12), as well as a transparent bulb body 44 that encloses an incandescent filament. The base sleeve 41 forms a first lamp base contact that is connected to the first socket contact 13 in an electrically conductive fashion by means of the tabs 252, 253 after the insertion of the incandescent lamp 4 into the receptacle 12 of the holding device 2. The center contact 42 of the lamp base 40 contacts the second section 262 of the second socket contact 16 and is thereby connected to the second electrical connection 14 of the holding device 2 in an electrically conductive fashion. The tabs 252 and 253 form a stop for two studs 43 of the lamp base 40, which diametrically protrude from the base sleeve 41, and the four support tabs 254 rest against the base sleeve 41 after the insertion of the incandescent lamp 4 or its lamp base 40 into the opening 251 of the cover plate 250.

Figure 11:
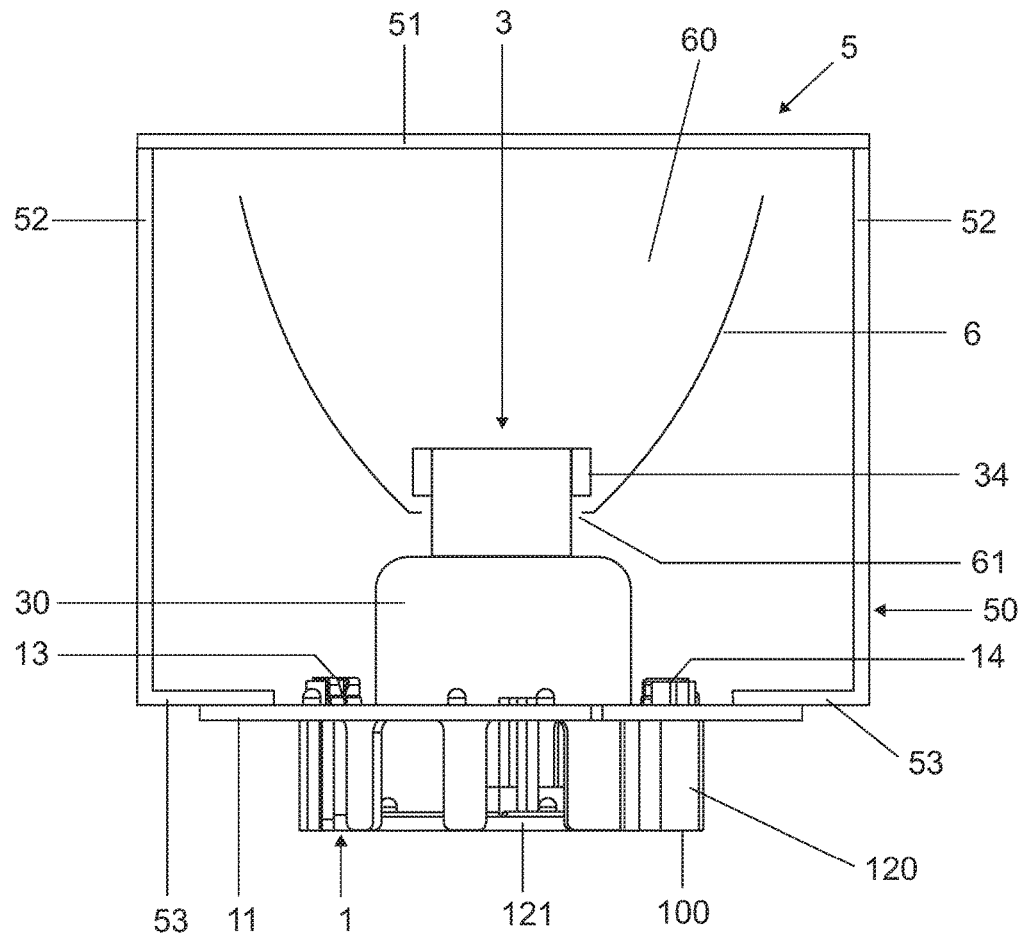
FIG. 11 shows a schematic representation of a vehicle light with a holding device according to the first embodiment and an LED lamp.

FIG. 11 schematically shows a vehicle light 5 with a holding device 1 according to the first embodiment and an LED lamp 3. The vehicle light 5 features a housing 50 with a transparent front side 51, sidewalls 52 and an open rear side 53. In addition, FIG. 11 schematically shows an optional parabolic reflector 6, which is arranged within the housing 50 such that its light emission aperture 60 faces the front side 51 and its installation opening 61 faces the rear side 53. The installation opening 61 of the reflector 6 features (not-shown) recesses that are adapted to the locking tabs 34 of the LED lamp 3 and make it possible to produce a bayonet coupling between the LED lamp 3 and the reflector. For example, the reflector 6 forms part of the vehicle light 5 and is connected to the housing 50 or alternatively realized in the form of a separate component. In the first instance, the LED lamp 3 is installed in the installation opening 61 of the reflector 6 by the locking tabs 34 through the open rear side 53 of the vehicle light 5 and the holding device 1 is subsequently attached to the base contacts 31, 32 of the LED lamp 3 such that the plate-like section 11 of the holding device 1 rests against the rear side 53 of the housing 50. The plate-like section 11 of the holding device 1 is fixed by being screwed to the rear side 53 of the housing 50. For this purpose, (not-shown) screws and (not-shown) screw holes in the plate-like section 11, as well as in the housing 50 of the vehicle light 5 are provided. In both instances, the holding device 1 is arranged on the rear side 53 of the vehicle light 5 and thereby closes the open rear side 53 of the housing 50, wherein its electrical connections 13, 14 are accessible, for example, to (not-shown) electrical connecting cables from the rear side 100 or bottom side 100 of the holding device 1, which faces away from the plate-like section 11. The reflector 6 is optional and can also be omitted, if applicable.

Figure 12:
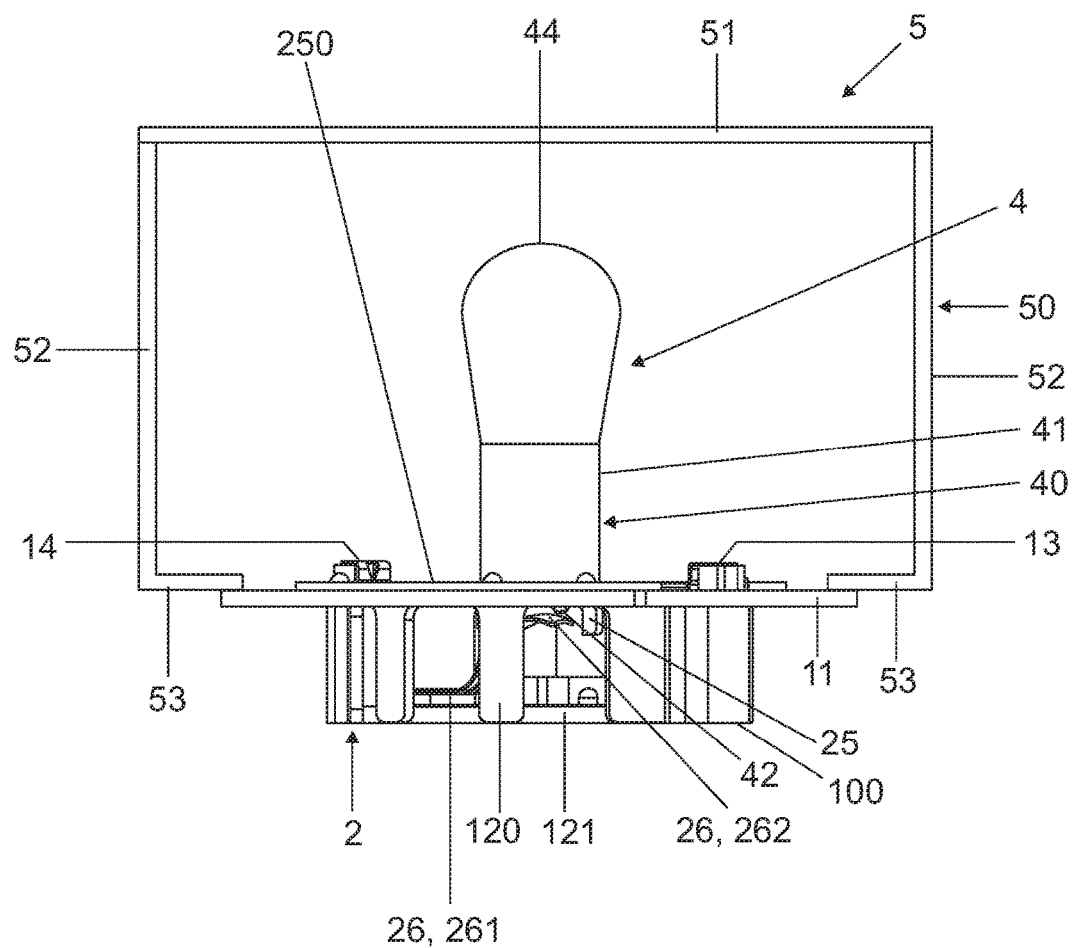
FIG. 12 shows a schematic representation of a vehicle light with a holding device according to the second embodiment and an incandescent lamp.

FIG. 12 schematically shows the vehicle light 5 illustrated in FIG. 11 with a holding device 2 according to the second embodiment and an incandescent lamp 4. If applicable, the vehicle light 5 may also feature a reflector for the incandescent lamp 4. In order to install the incandescent lamp 4 in the vehicle light 5, the incandescent lamp 4 is respectively fixed in the receptacle 12 of the holding device 2 and in the opening 251 of the cover plate 250 with its lamp base 40 and the holding device 2 with the incandescent lamp 4 is subsequently installed on the rear side 53 of the vehicle light 5 such that the incandescent lamp 4 is arranged in the interior of the housing 50 and the plate-like section 11 of the holding device 2 closes the rear side 53 of the housing 50. The plate-like section 11 of the holding device 2 is screwed to the rear side 53 of the housing 50 and the electrical connections 13, 14 of the holding device 2 are accessible, for example, for attaching electrical connecting cables from the rear side 100 or bottom side 100 of the holding device 2, which faces away from the plate-like section 11. In order to screw the plate-like section 11 to the housing 50, (not-shown) screws and (not-shown) screw holes arranged in the plate-like section 11, as well as in the housing 50 of the vehicle light 5 are provided.

The invention is not limited to the above-described embodiments. For example, the inventive holding device may feature multiple receptacles 12 for one respective lamp.

In addition, the inventive vehicle light may also feature multiple inventive holding devices.

LIST OF REFERENCE SIGNS 1, 2 Holding device
10 Injection-molded plastic part
11 Plate-like section
12 Receptacle
100 Rear side or bottom side of holding device
111 Projections in plate-like section
120 Annular sidewall
121 Bottom
122 Projections on bottom
123 Projections on bottom
124 Web
130 Ventilation holes
13 First electrical connection
14 Second electrical connection
15 First socket contact
151 Flat socket contact section of first socket contact
152 Web-like socket contact section of the first socket contact
16 Second socket contact
161 Flat socket contact section of second socket contact
162 Web-like socket contact section of second socket contact
25 First socket contact
26 Second socket contact
250 Cover plate
251 Opening in cover plate
252 Tab on edge of opening
253 Tab on edge of opening
254 Support tabs
261 First section of 26
262 Second, angled section of 26
3 LED lamp
30 Heat sink of LED lamp
31, 32 Contact pins of LED lamp
33 Semiconductor light source arrangement of LED lamp
34 Locking tabs of LED lamp
4 Incandescent lamp
40 Incandescent lamp base
41 Base sleeve of incandescent lamp base
42 Center contact of incandescent lamp base
43 Studs of incandescent lamp base
44 Bulb body
5 Vehicle light
50 Housing of vehicle light
51 Front side of housing
52 Sidewalls of housing
53 Rear side of housing
6 Reflector
60 Light emission aperture of reflector
61 Installation opening of reflector While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A holding device for lamps in vehicle lights, the holding device comprising:
   a plate-like section that is provided with at least one receptacle for receiving a lamp; and
   socket contacts for energy supply of the lamp arranged on a bottom portion of the receptacle; wherein the sockets contacts comprise a socket contact section that extends away from the bottom portion of the receptacle; and wherein the socket contact section is configured to receive a contact of the lamp;
   wherein the at least one receptacle is realized in such a way that it provides space for different types of lamps.

2. The holding device of claim 1,
   wherein at least the plate-like section is realized in the form of an injection-molded plastic part.

3. The holding device of claim 1,
   wherein the socket contacts are punched-and-bent parts.

4. The holding device of claim 1, further comprising:
   electrical connections that are connected to the socket contacts in an electrically conductive fashion.

5. The holding device of claim 4,
   wherein the electrical connections are arranged diametrically on an edge of the receptacle.

6. The holding device of claim 4,
   wherein the electrical connections are integrally connected to the socket contacts.

7. The holding device of claim 1,
   wherein the socket contacts are adapted to the contacts of an incandescent lamp base or an LED lamp.

8. The holding device of claim 1,
   wherein the at least one receptacle comprises at least one wall, wherein the wall surrounds an interior of the receptacle.

9. The holding device of claim 8,
   wherein the at least one wall is equipped with ventilation openings.

10. The holding device of claim 1,
    wherein the holding device is equipped with means for adapting the at least one receptacle to outside dimensions of a lamp.

11. The holding device of claim 10,
    wherein the means for adapting the at least one receptacle to the outside dimensions of a lamp comprise a cover for the at least one receptacle, which is provided with an opening.

12. A vehicle light, comprising:
    at least one holding device, comprising:
      a plate-like section that is provided with at least one receptacle for receiving a lamp; and
      socket contacts for energy supply of the lamp arranged on a bottom portion of the receptacle;
      wherein the socket contacts comprise a socket contact section that extends away from the bottom portion of the receptacle; and wherein the socket contact section is configured to receive a contact of the lamp;
      wherein the at least one receptacle is realized in such a way that it provides space for different types of lamps.

* * * * *